United States Patent

[11] 3,608,820

| | | |
|---|---|---|
| [72] | Inventor | Eugene K. Kooser<br>1510 Ronson Drive, Houston, Tex. 77055 |
| [21] | Appl. No. | 781,624 |
| [22] | Filed | Dec. 5, 1968 |
| [45] | Patented | Sept. 28, 1971 |

[54] TREATMENT OF ATMOSPHERIC CONDITIONS BY INTERMITTENT DISPENSING OF MATERIALS THEREIN
7 Claims, No Drawings

[52] U.S. Cl. .................................................. 239/2 R
[51] Int. Cl. ..................................................... A01g 15/00
[50] Field of Search .......................................... 239/2, 14; 252/305, 310

[56] References Cited
UNITED STATES PATENTS

| | | | |
|---|---|---|---|
| 2,895,679 | 7/1959 | Elton ............................ | 239/2 |
| 2,934,275 | 4/1960 | Ball .............................. | 239/2 |
| 3,084,024 | 4/1963 | Hamilton et al. .............. | 239/2 X |
| 3,375,148 | 3/1968 | Finnegan et al. .............. | 239/2 X |
| 3,378,201 | 4/1968 | Glew et al. .................... | 239/2 |
| 3,429,507 | 2/1969 | Jones ............................ | 239/2 |

FOREIGN PATENTS

| | | | |
|---|---|---|---|
| 1,148,879 | 5/1963 | Germany ..................... | 239/14 |

OTHER REFERENCES

Space/Aeronautics, " Getting Rid of Airport Fog" Oct. 1968, pages 80– 82 relied on.

*Primary Examiner*—Lloyd L. King
*Attorney*—Christen, & Sabol

ABSTRACT: Methods of treating atmospheric conditions including intermittently dispensing unbalancing materials such as salts, surfactants, water soluble polyelectrolytes or mixtures thereof in the atmosphere and methods of dispersing fog including dispensing materials that cause coalescence of water droplets in spaced locations throughout a fog.

3,608,820

TREATMENT OF ATMOSPHERIC CONDITIONS BY INTERMITTENT DISPENSING OF MATERIALS THEREIN

BACKGROUND OF THE INVENTION

The present invention pertains to methods of treating atmospheric conditions and more particularly to methods of treating atmospheric conditions by intermittently dispensing materials therein.

Treatment of atmospheric conditions has long been attempted to increase rain, prevent or suppress hail and disperse fog; however, no conventional methods of treating the atmosphere have been found effective to consistently provide the above objects. Prior methods of increasing rain, suppressing hail and dispersing fog such as by dispensing salt therein have been entirely unpredictable and thus have not provided the dependability desired for treatment of these conditions.

Part of the reason for the lack of success of prior art methods of treating atmospheric conditions is that the atmospheric conditions sought to be controlled are not fully understood. That is, the conditions of the clouds from which rain is sought to be increased, the cumulus hail clouds and the characteristics of fog banks have not been understood sufficiently by those attempting to treat these conditions.

This especially true with respect to fog banks, and the dispersal of fog is a pressing problem due to the stifling effect of fog on air surface travel. It is not uncommon for fog to close airports and seaports for days at a time as well as limiting road travel, and stoppage of air and surface travel causes millions of dollars in losses yearly. Furthermore, fogs can be lethal in that they enhance air pollution and stifle air movement.

Prior art methods of treating atmospheric conditions teach the dispensing of various materials continuously over a fog or cloud in such a manner as to provide complete coverage thereof in an attempt to unbalance the stable equilibrium state of the fog or cloud to cause coalescence of the water droplets therein. These methods are disadvantageous, aside from their unpredictability and general ineffectiveness, due to the great quantity of materials expended.

SUMMARY OF THE INVENTION

Accordingly it is an object of the present invention to treat atmospheric conditions by intermittently dispensing unbalancing material therein.

Another object of the present invention is to provide a method of treating atmospheric conditions to obtain consistent results with small quantities of unbalancing materials.

A further object of the present invention is to disperse fog by dispensing therein materials for causing coalescence of water droplets at spaced locations to form pockets of instability.

The present invention has another object in that fog is dispersed by intermittently dispensing surfactants, surfactants, soluble polyelectrolytes or mixtures thereof in the fog.

Some of the advantages of the methods of the present invention over prior art methods are that atmospheric conditions are treated with consistently good results, that only small quantities of materials are required and that fog is dispersed quickly and simply by creating pockets of instability therein.

The present invention is generally characterized in a method of treating atmospheric conditions including intermittently dispensing unbalancing materials in the unconfined, nonvacuous atmosphere.

Further objects and advantages of the present invention will become apparent from the following description of the preferred embodiments.

DESCRIPTION OF THE PREFERRED EMBODIMENTS

The present invention will be described with respect to fogs; however, the methods of the present invention are applicable to treating all atmospheric conditions having the same basic characteristics. Thus, the methods of the present invention are useful in increasing rainfall and suppressing hail as well as dispersing fog since the primary object is the same; that is, since clouds and fogs are composed of masses of water droplets, to cause the water droplets in the cloud or fog to coalesce and drop to the ground.

There are many theories as to the composition and characteristics of fogs; however, the characteristic of fogs that is of primary importance is that fogs are in a stable state of equilibrium.

The selection of materials to be dispensed in the atmosphere for dispersing fog is normally based on a theory of fog composition. For instance, surfactants are dispensed in the atmosphere in accordance with the present invention on the theory that the surface tension between water droplets acts to maintain fogs in a stable state of equilibrium and the surfactant reduces the tension to permits the water droplets to change from a spherical to an elongated shape and join together or coalesce to form large drops of water that fall to the ground thereby dispersing the fog.

The theory behind the dispensing of water-soluble polyelectrolytes in the atmosphere to disperse fog in accordance with the present invention is that the water droplets in the fog have like charges associated therewith to cause the droplets to assume a suspended state due to the mutually repelling nature of the like charges and the water-soluble polyelectrolyte adds opposite charges to cause the water droplets to be attracted to one another to coalesce and form large drops of water that fall to the ground thereby dispersing the fog.

U.S. Pat. No. 2,756,097 to Brandau and Kooser discloses the dispensing of water and various ionic salts in the atmosphere on the theory that this unbalances the state of electrical equilibrium of fog.

The present invention is concerned not with contraverting theories of fog composition but rather with more fully utilizing these theories to disperse fogs. As previously mentioned, in the past a fog to be treated was subjected to complete coverage with unbalancing materials, and such materials were normally dispensed in a continuous path from an aircraft. The present invention is based on the recognition that since the entire fog to be treated is in a state of equilibrium it would be best to treat only isolated portions of the fog with unbalancing materials to thereby provide pockets of instability which effectively dissipate the stability and equilibrium of the entire fog.

It is believed that the effect sometimes caused by prior art methods of treating atmospheric conditions is that rather than upsetting or unbalancing the state of equilibrium of a fog a new state of equilibrium is established. For instance, where a charged material is dispensed in the atmosphere it is believed that the continuous seeding of the material can cause complete reversal of the charges on the water droplets to cause them to remain in suspension due to mutually repelling charges of the opposite polarity.

It has been found that by intermittently dispensing unbalancing materials in a fog, coalescence of the water droplets consistently results and that the instability and unbalance caused at the locations where the materials are dispensed spread throughout the entire fog to permit maximum water droplet coalescence and complete dispersal of fogs.

The basic concept of the methods of the present invention may be utilized with all unbalancing materials used to treat atmospheric conditions since these materials seek to disturb a state of equilibrium and this is best accomplished by intermittent dispensing of the materials. However, the methods of the present invention have been found to be extremely effective when dispensing surfactants and water-soluble polyelectrolytes either singularly or in admixture with each other in the atmosphere.

Any surfactant may be dispensed in the atmosphere in accordance with the present invention since surfactants are defined as surface active agents which includes any compounds that affect surface tension when dissolved in water or water solutions such as sodium salts of high molecular weight alkyl sulfates, or sulfonates. It is clear that while all surfactants will provide the desired results, the more desirable surfactant is chosen by its minimal effect on life on the ground.

Examples of surfactants useful in practicing the present invention include nonionic surfactants such as alkyl phenyl ether of polyethylene glycol; trimethyl nonyl ether of polyethylene glycol; and alkyl ether of polyalkylene glycols and ionic surfactants such as $C_4H_9CH(C_2H_5) C_2H_4CH(SO_4Na)C_2H_4CH(C_2H_5)_2$; $[C_4H_9CH(C_2H_5)CH_2]_2NaPO_4$; $C_4H_9CH(C_2H_5)C_2H_4CH(SO_4Na)CH_2CH(CH_3)_2$; $C_4H_9CH(C_2H_5)CH_2SO_4Na$ and $C_3H_7CH_2C(C_2H_5):CHSO_2ONa$. The surfactants can also be incorporated as components of synthetic detergents which include mixtures of surface-active agents with inorganic salts, such as: sodium tripolyphosphates, pyrophosphates and sodium sulfates. One commercial synthetic detergent useful in practicing the present invention includes a mixture of sodium tripolyphosphate and sodium lauryl sulfate.

As previously stated, it is believed that surfactants operate on a cloud of fog bank by permitting water droplets to change from a spherical to an elongated shape and join together to form large drops of water which fall to the ground. This coalescence of water droplets may be the actual objective of a project such as to increase rainfall or it may be the requirement for stopping the growth of a prospective hail cloud or dispersing a fog bank.

Similarly, any water soluble polyelectrolyte may be dispensed in the atmosphere in accordance with the present invention with the practical choice in consideration of ground effect mentioned above with respect to surfactants. Polyelectrolytes are high molecular weight polymers of either natural origin or of a synthetic nature which exhibit properties similar to conventional electrolytes. However, polyelectrolytes in solution do not disassociate to give a uniform distribution of positive and negative ions since the ions of one polarity are bound in the polymer chain and only ions of the opposite polarity are permitted to freely diffuse.

Polyelectrolytes are commercially available and examples thereof suitable for practicing the present invention include polymers containing recurring sulfonium groups such as those taught by U.S. Pat. No. 3,401,152; polymers containing recurring phosphonium groups such as polymers of trivinyl phosponum halides taught by U.S Pat. No. 3,294,764 and polymers containing recurring ammonium groups such as quadinary ammonium groups such as those taught by U.S. Pat. No. 3,265,734.

RETEN 210, a polyelectrolyte manufactured by Hercules Powder Company and polyelectrolyte manufactured by Calgon catalogued as 823–C have been found suitable for practicing the present invention.

As previously mentioned, it is believed that along with the surface tension of water droplets, a cloud or fog bank is also maintained in a state of equilibrium by similar charges on the water droplets which causes a suspended state of repelling water droplets. Thus by dispensing a water soluble polyelectrolyte in the cloud or fog bank, some of the charges will be altered to cause attraction of water droplets to form larger drops and fall to the ground to thereby cause increased rainfall, suppress the growth of prospective rain clouds or disperse fog.

Mixtures of surfactants and water-soluble polyelectrolytes are obviously very effective in causing coalescence of water droplets due to the combined decrease in surface tension and the removal of like charges, and the proportions utilized in such mixtures are not critical and may depend on the atmosphere being treated. Normally a mixture of 50 parts surfactant to 50 parts water soluble polyelectrolyte is very effective; however, where a thin fog is to be dispersed, for example, it is desirable to use a greater percentage of surfactant. One example of a commercially available mixture of water soluble polyelectrolytes and surfactants useful with the present invention is Ultra-blend 100 manufactured by The Witco Company.

In order to increase rainfall, a method according to the present invention includes the intermittent dispensing of unbalancing materials in a cloud from an aircraft. The aircraft is flow over the cloud and the material is dispensed in intermittent spurts or pulses thereby creating pockets of instability caused by coalescence of water droplets. These pockets will spread to cause rain throughout the entire cloud; however this procedure may be expedited by covering the entire cloud with the material once the pockets of instability are established since the danger of further creating a state of equilibrium has been avoided.

Essentially, the same method as explained above may be used with hail suppression; however, the desired end result is not precipitation itself but the effect of stopping he vertical development of a cumulus cloud by causing water droplets therein to fall to the ground due to coalescence caused by the material thereby preventing water droplets from traveling in vertical cycles to build up the cloud in layers and preventing hail.

In fog dispersal, the method of dispensing materials is more important than in the methods mentioned above because normally a specified area is desired to be cleared to permit air and/or surface travel. Thus, winds must be contended with which otherwise would move new fog into the cleared area, and furthermore the area to be cleared is normally large and the dispersal must be complete.

A particular and most important application of fog dispersal techniques will be discussed hereinafter with respect to airports; however, the application to airports is illustrative and the steps taken may be used with any specified area to be cleared. There are two situations with which to contend in fog dispersal, and they are dispersal of developed fog banks and the prevention of the development of fog banks.

It has been found that the height and density of a fog are inversely proportional to some extent to the quantity of unbalancing materials necessary to disperse the fog. That is, a small or undeveloped fog should be treated with a large quantity of material because the fog is not stable, and therefore a thorough seeding of materials will disperse the fog without the danger of further creating a state of equilibrium. A large, fully developed, stable fog is best dispersed with a smaller quantity of material intermittently dispensed therein to cause pockets of instability throughout the fog.

The optimum manner in which to keep an airport open at all times is to seed the fog as it begins to develop with unbalancing materials such as slats, surfactants, water soluble polyelectrolytes or mixtures thereof, however, due to airport traffic this is not always practical. Furthermore, most ground fogs develop at night due to radiation and, therefore, must be dispersed after full development. When treating a semideveloped fog bank the method is direct as mentioned above; that is, an aircraft is flown over as much of the fog as is possible while dispensing unbalancing materials; and, since during development, a fog bank does not have the equilibrium established in a fully developed fog, the instability of the fog coupled with the additional instability caused by the materials permits the fog to be dispersed quickly.

With a fully developed fog, dispersal is not as easily accomplished and even though the intermittent dispensing of unbalancing materials such as salts, surfactants, water-soluble polyelectrolytes and mixtures thereof in accordance with the present invention is effective, there are further methods useful for increasing their effectiveness according to the present invention. When there is a substantial wind present, a method of dispersing fog according to the present invention includes intermittently dispensing the material from an aircraft in a path transverse to the wind direction and upwind of the area to be cleared and thereafter working into the wind while dispensing materials to provide a type of damming effect. When there is no wind present, to disperse fog in accordance with a method of the present invention, the first step is to make an observation flight above the fog bank to detect unstable or weak spots. Weak spots, or points of instability and coalescence, are detectable due to their darkness which is caused by the lesser amount of light reflected by larger drops of water than the normal constituent water droplets in a fog bank. If a weak spot is detected, seeding is commenced at this spot and preferably unbalancing materials are dispensed while flying in ever increasing diameter circles around the weak spot. Many times the dispersal of fog in such a spot will act in the manner of pulling a stopper from a tube of water; that is, the remainder of the fog bank will flow towards the treated area, become unstable and coalesce. If this is not effective in itself, the next step is to intermittently dispense the materials in a path leading to the area to be cleared to permit easier flow. The results achieved by working on a weak spot in a fog bank are so good that any weak spot detected within a 5 mile radius of the area to be cleared should be worked before attacking the fog over the area to be cleared.

If no weak spots are detected, the first step is to fly a front course of the instrument landing system (LLS) of the airport, preferably over a central runway while intermittently dispensing unbalancing materials. It should be realized that a zero visibility situation will probably exist thereby requiring the ILS; and, accordingly, a back course is then flown at approximately the same altitude. After one or more of these ILS seeding runs, the plane is then flown on top of the fog for observation. As previously mentioned, points of instability are easily detected due to their darkness, and if the ILS runs are effective, a series of dark depressions will be observed which will spread to form a valley. After a period of time similar valleys, called windrows, will appear in parallel with the ILS valley and spread from the ILS path until ground is visible. Once ground is visible, the entire area to be cleared is covered with the material in a followup pattern that is designed to completely disperse all fog over the area to be cleared. To this end, the pattern may be increasing diameter circular paths, crisscross paths or parallel paths, it being primarily important to use a pattern that will completely cover the area since instability has already been established. It is noted that during followup the pilot will have a view of the ground to permit visual guidance to control the pattern.

According to the present invention materials may be dispensed into the atmosphere from the air by utilizing an aircraft equipped with nozzles and a venturi secured to its underside. The nozzles are used to dispense materials in liquid form and are connected with tanks and pumps in the aircraft such that the materials dispensed and the amount thereof may be controlled by the pilot or a passenger in the plane. Thus, various materials may be dispensed simultaneously from separate nozzles or may be mixed in the tanks and dispensed from the same nozzle and the intermittent spurts or pulses of materials are provided by controlling the pumps. Similarly, drums are disposed inside the plane and materials in powder form may be loaded therein for dispensing through the venturi etther singularly or as mixtures under the control of a valve to provide intermittent pulses.

Materials according to the present invention may be dispensed into the atmosphere from the ground by the use of a unit called Fog-Sweep manufactured by the John Bean Division of FMC Corporation. Thus unit includes a large air fan and a long flexible tube mounted on a trailer and is capable of dispensing liquid and powder materials more than 200 feet into the air. The unit can rotate on the trailer as the trailer is towed through a specified area to provide a good range of operation and intermittent pulses.

Another manner of implementing the present invention from the ground is to loft unbalancing materials in to the atmosphere by balloons or missiles which dispense the materials at a predetermined height to provide a series of pockets of instability.

Due to the high molecular weight of the water-soluble polyelectrolytes for use with the present invention, it is desirable to dilute liquid polyelectrolytes with water, the proportions not being critical, in order to facilitate dispensing thereof. The rate of dispensing unbalancing materials in accordance with the present invention depends on the character of atmospheric conditions, and these materials need only be dispensed in small quantities due to the intermittent dispensing thereof. For instance, in liquid form one-half pint to 1 gallon of the materials per mile is sufficient and in powder form the materials may be dispensed in the range of one-half of a pound to 10 pounds per mile with the maximum amount of material usually being determined by an economic factor.

It is not intended that the present invention be limited by the theories set forth above with respect to how the materials disperse fog and act on atmospheric conditions, it being primarily important only that unbalancing materials are extremely effective to disperse fog, increase rainfall and suppress the formation of hail clouds when intermittently dispensed in the atmosphere.

What is claimed is:

1. A method of treating atmospheric conditions comprising intermittently dispensing unbalancing material, said material being selected from the group consisting of surfactants and water soluble polyelectrolytes, in the unconfined, nonvacuous atmosphere to provide a plurality of discrete spaced pockets of instability therein.

2. The method as recited in claim 1, wherein the material is a surfactant.

3. The method as recited in claim 3 wherein the surfactant is selected from the group consisting of alkyl phenyl ether of polyethylene glycol, trimethyl nonyl ether of polyethylene glycol, alkyl ether of polyalkylene glycols, $C_4H_9CH(C_2H_5)C_2H_4CH(SO_4Na)C_2H_4CH(C_2H_5)_2$, $[C_4H_9CH(C_2H_5)CH_2]_2NaPO_4$, $C_4H_9CH(CB2H_5)C_2H_4CH(SO_4Na)CH_2CH(CH_3)_2$, $C_4H_9CH(C_2H_5)CH_2SO_4Na$, and $C_3H_7CH_2C(C_2H_5):CHSO_2ONa$.

4. The method as recited in claim 1 wherein the material is a water-soluble polyelectrolyte.

5. The method as recited in claim 4 wherein the water soluble polyelectrolyte is a polymer having recurring units selected from the group consisting of sulfonium radicals, phosphonium radicals and ammonium radicals.

6. The method as recited in claim 1, wherein the material contains at least one surfactant and at least one water-soluble polyelectrolyte.

7. A method of dispersing fog comprising dispensing material capable of causing coalescence of water droplets, said material being selected from the group consisting of surfactants and water-soluble polyelectrolytes, at spaced locations throughout a fog to cause pockets of instability throughout the fog.